United States Patent [19]

Miller

[11] 4,082,425
[45] Apr. 4, 1978

[54] OPTICAL COUPLER

[75] Inventor: Arthur Miller, Princeton Junction, N.J.

[73] Assignee: RCA Corporation, New York, N.Y.

[21] Appl. No.: 751,169

[22] Filed: Dec. 16, 1976

[51] Int. Cl.$^2$ ............................................. G02B 5/14
[52] U.S. Cl. ......................... 350/96.17; 350/96.19; 350/162 R
[58] Field of Search ........... 350/96 C, 96 WG, 162 R

[56] References Cited

U.S. PATENT DOCUMENTS

| 3,674,336 | 7/1976 | Kogelnik | 350/96 C |
| 3,912,363 | 10/1975 | Hammer | 350/96 C |
| 3,982,810 | 9/1976 | Tamir et al. | 350/96 C |

OTHER PUBLICATIONS

IBM Tech. Disc. Bulletin, vol. 13, No. 9, Feb. 71 Article by Ash et al. Interconnection of Optical Fibers to Planar Optical Integrated Circuitry.

*Primary Examiner*—John K. Corbin
*Assistant Examiner*—Stewart Levy
*Attorney, Agent, or Firm*—Leonard Weiss; Joseph D. Lazar; H. Christoffersen

[57] ABSTRACT

First and second diffraction gratings have a common fundamental spatial frequency. A coupling assembly is formed by connecting the gratings together with bars of the first grating at an angle of approximately $10^{-3}$ radians to bars of the second grating. The coupling assembly is mounted upon a waveguide carried by a substrate. A fiber is moved to a multiplicity of locations on the coupling assembly while light is transmitted through the waveguide. The fiber is fixedly connected to the coupling assembly at a location where there is a maximum amount of the light coupled from the waveguide to the fiber, whereby the fiber and the substrate form a sandwich that includes the coupling assembly and the waveguide. An etching process is used to remove parts of the coupling assembly that are not within the sandwich.

8 Claims, 7 Drawing Figures

OPTICAL COUPLER

Cross-reference to related applications of interest is my application Ser. No. 675,260, filed Apr. 8, 1976 entitled "OPTICAL COUPLER" now abandoned, and a continuation-in-part Ser. No. 751,171 of said application filed on Dec. 16, 1976.

BACKGROUND OF THE INVENTION

1. Field of the Invention

This invention relates to optics and more particularly to coupling electromagnetic energy between a fiber and a substrate.

2. Description of the Prior Art

In an electrical communication system, a message comprises an electrical signal transmitted through a copper wire which spans a distance between two terminals. The wire is an undesirable feature of the electrical system because copper is expensive, heavy and (because of extensive usage) will ultimately be in short supply. Since the wire is undesirable, an attractive alternative to the electrical system is an optical communication system where a light-conducting fiber spans the distance between the terminals and a message comprises a modulated light beam transmitted therethrough.

In addition to the fiber, the optical system may include either a channel or a planar waveguide comprised of what is known as an electro-optic material. The electro-optic material has a high refractive index that changes in response to a change of a voltage applied thereto. Being formed of the electro-optic material, the waveguide may be used as a signal processing element, such as a modulator, a demodulator, or a switch.

An essential feature of such an optical system is a coupling of light into the fiber from the waveguide, and vice versa. The light may be coupled by a type of optical coupler predicated upon evanescent waves emanating from a conductor of electromagnetic energy.

The existence of evanescent waves is the subject matter of a well known experiment where a beam of light is transmitted along a line of entry to a transparent first prism. The first prism has two faces at right angles to each other, and a hypotenuse face which forms a forty-five degree angle with each of the right-angle faces.

The line of entry is perpendicular to one of the right-angle faces whereby the hypotenuse face has the beam transmitted thereto with an angle of incidence of forty-five degrees. The first prism has a refractive index that causes a total reflection of the beam within the first prism from the hypotenuse face thereby causing the beam to exit from the first prism perpendicularly through the other right angle face.

A second prism, similar to the first prism, has a hypotenuse face which is placed against the hypotenuse face of the first prism, whereby the prisms form a transparent rectangular solid. The beam is transmitted through the rectangular solid along the line of entry. However, when the hypotenuse faces are separated by a small distance, typically less than or equal to a wavelength of the beam, one portion of the beam is reflected from the hypotenuse face of the first prism, as described hereinbefore, while another portion of the beam is transmitted through the prisms along the line of entry.

This experiment demonstrates that the reflection of the beam from the hypotenuse face of the first prism causes an existence external thereto of waves of electromagnetic energy. The waves of electromagnetic energy are the evanescent waves referred to hereinbefore. In the optical coupler, the coupling into the fiber from the waveguide (and vice versa) is via evanescent waves.

The first prism is referred to as a distributed optical coupler because coupling is provided over a length that is many times the wavelength of the coupled electromagnetic energy (i.e., the length of the hypotenuse face of the first prism). A distributed coupler causes electromagnetic energy transmitted thereto from an input device, such as a fiber, to have electric and magnetic moments which vary in space and in time synchronously with the phase of a wave of electromagnetic energy which could propagate in a coupled output device, such as a waveguide. The synchronous propagation of electromagnetic energy is referred to as phase matching.

Phase matching may be achieved when a distributed coupler is a periodic diffraction grating disposed in a coupling region where the grating couples the waveguide to the fiber via evanescent waves. It should be understood that the grating, unlike the prisms, is substantially planar. Additionally, the waveguide and the fiber are substantially planar. Therefore, the grating, the waveguide, and a coupled portion of the fiber may be integrated into a planar assembly that is mechanically stable and durable.

Usually, the waveguide has a thickness on the order of one micron. Because of the one micron thickness, the waveguide is mounted on a supporting structure known as a substrate. Typically, the distributed grating coupler has associated with it a problem of inefficiency because the grating couples a portion of the electromagnetic energy (light) into the substrate.

SUMMARY OF THE INVENTION

According to the present invention, first and second diffraction gratings, with a common spatial frequency, diffract first and second percentages of input light, respectively; a surface of the first grating is contiguously connected to a surface of the second grating to form a coupling assembly with a separation angle between bars of the first grating and bars of the second grating that causes a spatially varying overlap of the bars of the first grating by the bars of the second grating; the coupling assembly has a free surface and a surface that is connected to a waveguide carried by a substrate; a fiber is fixedly connected to the free surface at a location where light may be coupled between the fiber and the waveguide with substantially no light coupled to the substrate; all parts of the coupler and the waveguide, which are not within a sandwich formed by the fiber and the waveguide, are removed.

DESCRIPTION OF THE PREFERRED EMBODIMENT

Figure 1:
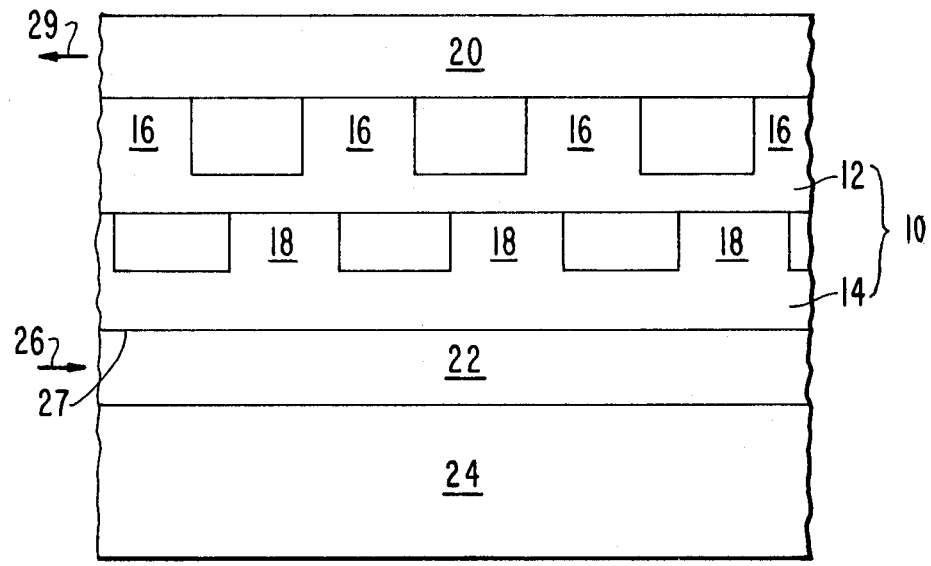
FIG. 1 is a side elevation of a segment of a waveguide coupled to a segment of a fiber by an optical coupler.

The present invention is a method of constructing an optical coupler from a pair of diffraction gratings. The optical coupler may be of a type that is disclosed in my application, Ser. No. 695,260 now abandoned, and the continuation-in-part thereof Ser. No. 751,171, which are cross-referenced hereinbefore. Shown in FIG. 1 is an optical coupler 10 that includes a phase diffraction grating 12 with a surface contiguously connected to a phase diffraction grating 14. Gratings 12 and 14 may be made from gelatin, photoresist, lithium niobate, or any other suitable material, as well known in the art.

Figure 2:
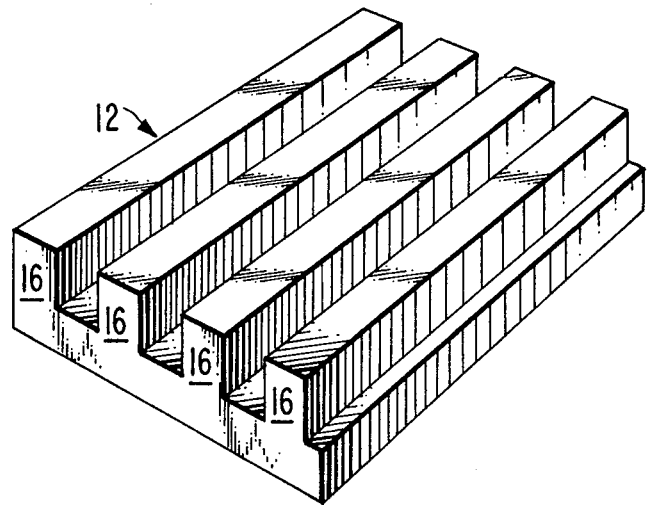
FIG. 2 is a perspective view of a diffraction grating in the coupler of FIG. 1.

As best shown in FIG. 2, grating 12 is formed by photographically etching photoresist, for example, to provide parallel, equally spaced, bars 16. In this embodiment, the width of bars 16 equals 900 angstrom units. Additionally, the spacing between bars 16 equals 900 angstrom units, whereby the period of grating 12 is 1,800 angstrom units. In an alternate embodiment, grating 12 may have any desired period.

When input light is provided to grating 12, the height of bars 16 determines a percentage of the input light that is diffracted (referred to herinafter as a diffraction strength) by grating 12. Accordingly, grating 12 has a first diffraction strength determined by the height of bars 16.

Grating 14 (FIG. 1) is formed in a manner similar to that described hereinbefore to provide bars 18 that have the width and spacing of bars 16 whereby gratings 12 and 14 have a common fundamental spatial frequency component. The height of bars 18 is selected to cause grating 14 to have a second diffraction strength. The first and second diffraction strengths have a relationship that is described hereinafter.

Coupler 10 is disposed between a fiber 20 and a waveguide 22 carried by a substrate 24. In this embodiment, waveguide 22 and substrate 24 are made from lithium niobate and lithium tantalate, respectively. However, it should be understood that waveguide 22 and substrate 24 may be made from any other suitable material. Additionally, in an alternative embodiment, coupler 10 may be disposed between any suitable light conducting medium and waveguide 22. Information on the construction, characteristics and mounting of diffraction gratings is given by the following articles: "Ion Beam Micromachining of Integrated Optics Components" in Applied Optics, Volume 12, Number 3, March 1973, by Hugh L. Garvin, E. Garmire, S. Somekh, H. Stoll and A. Yariv; and "Grating Coupler for Efficient Excitation of Optical Guided Waves in Thin Films" in Applied Physics Letters, Volume 16, Number 12, June 15, 1970, by M. L. Dakss, L. Kuhn, P. F. Heidrich, and B. A. Scott.

An input beam of light that is transmitted in a direction of an arrow 26 through waveguide 22 produces a first evanescent electromagnetic field which emanates therefrom through an interface 27 (between waveguide 22 and grating 14). The input light is coupled via the first evanescent field to gratings 12 and 14, thereby causing gratings 12 and 14 to provide diffracted light.

The diffracted light produces a second evanescent electromagnetic field near an interface 28 (between coupler 10 and fiber 20). A useful portion of the diffracted light is coupled, via the second evanescent field, into fiber 20 to provide an output beam of light that is transmitted in the direction of an arrow 29. Additionally, the diffracted light causes gratings 12 and 14 to provide first and second components, respectively, of a substrate electromagnetic field that extends into substrate 24. It should be understood that when there is an electromagnetic field within substrate 24, light (electromagnetic energy) is coupled thereto by coupler 10, thereby causing coupler 10 to be inefficient. As explained hereinafter, the coupling of light into substrate 24 is inhibited by suppressing the substrate field.

During a translation of grating 12 in the direction of arrow 26, the phase of the first field component continually changes. Moreover, during a translation of 1,800 angstrom units (the period of gratings 12 and 14) the phase of the first field component changes 360°. A first essential feature of coupler 10 is that grating 12 is translated to a position (relative to grating 14) that causes the first field component to have a phase opposite from the phase of the second field component.

A second essential feature of coupler 10 is that gratings 12 and 14 have diffraction strengths that cause the field components to have equal amplitudes. When both of the essential features are attained, the substrate field is suppressed, thereby inhibiting the coupling of light into substrate 24.

It should be understood that in accordance with the well known principle of time reversal symmetry, when a beam of input light is transmitted in the direction of arrow 29 through waveguide 20, coupler 10 causes a beam of output light to be transmitted within waveguide 22 in the direction of arrow 26. Therefore, coupler 10 is bilateral.

It should be appreciated that the prior art does not include a method of translating grating 12 to attain the first essential feature. Moreover, it is difficult to fabricate diffraction gratings that attain the second essential feature. In accordance with the present invention, an optical coupler is easily fabricated from a coupling assembly to attain both of the essential features.

Figure 3:
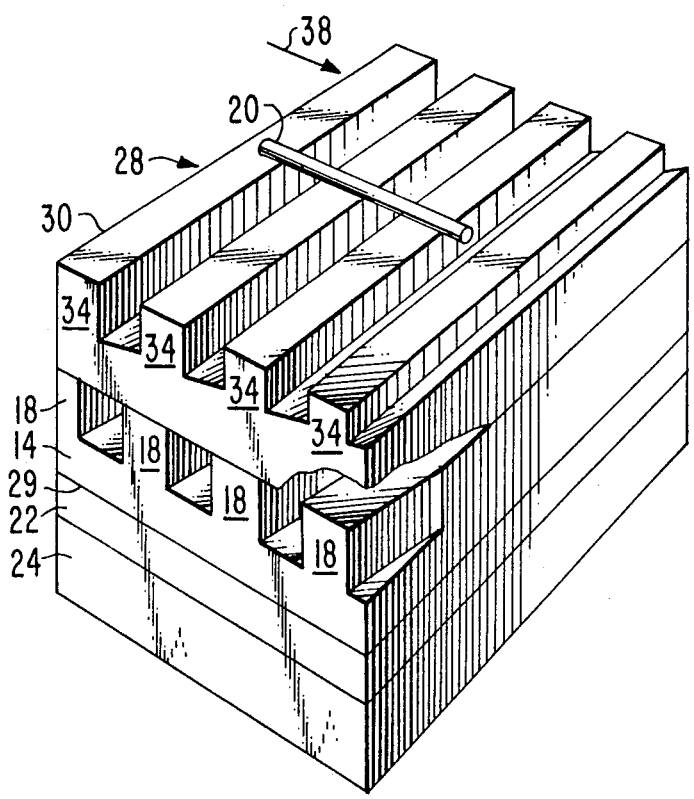
FIG. 3 is a perspective view, with parts broken away, of a coupling assembly disposed intermediate to a fiber and a waveguide carried by a substrate in accordance with the present invention.

Shown in FIG. 3 is a coupling assembly made by contiguously connecting a surface of a phase relief diffraction grating 30 to grating 14. Additionally, assembly 28 has a surface 29 fixedly connected to waveguide 22 which is carried by substrate 24 as described hereinbefore.

Figure 4:
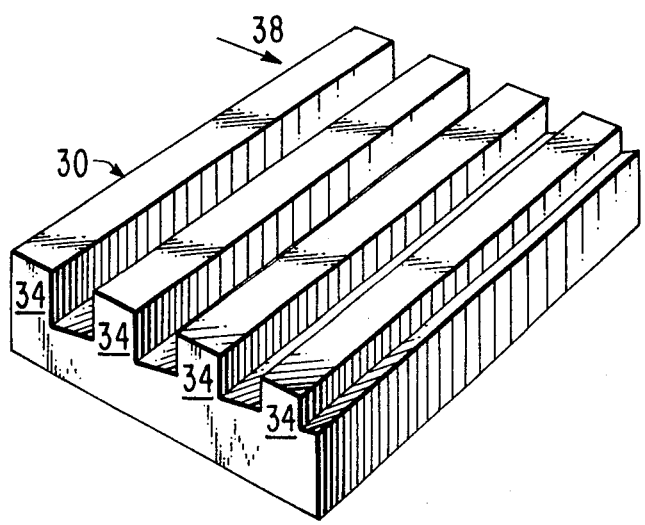
FIG. 4 is a perspective view of a diffraction grating included in the coupling assembly of FIG. 3.

As shown in FIG. 4, grating 30 is comprised of evenly spaced, bars 34 that are formed in a manner similar to that described in connections with gratings 12 and 14. Bars 34, however, have heights that vary linearly with respect to displacement in the direction of an arrow 38. The linear variation of the heights causes grating 30 to have a diffraction strength that varies linearly with respect to displacement in the direction of arrow 38. Additionally, bars 34 have the spacing of the bars 18, whereby gratings 14 and 30 are both spatially periodic with a common fundamental spatial frequency component. In an alternative embodiment, diffraction gratings, other than phase relief gratings, may be included in a coupling assembly instead of gratings 14 and 30.

Figure 5:
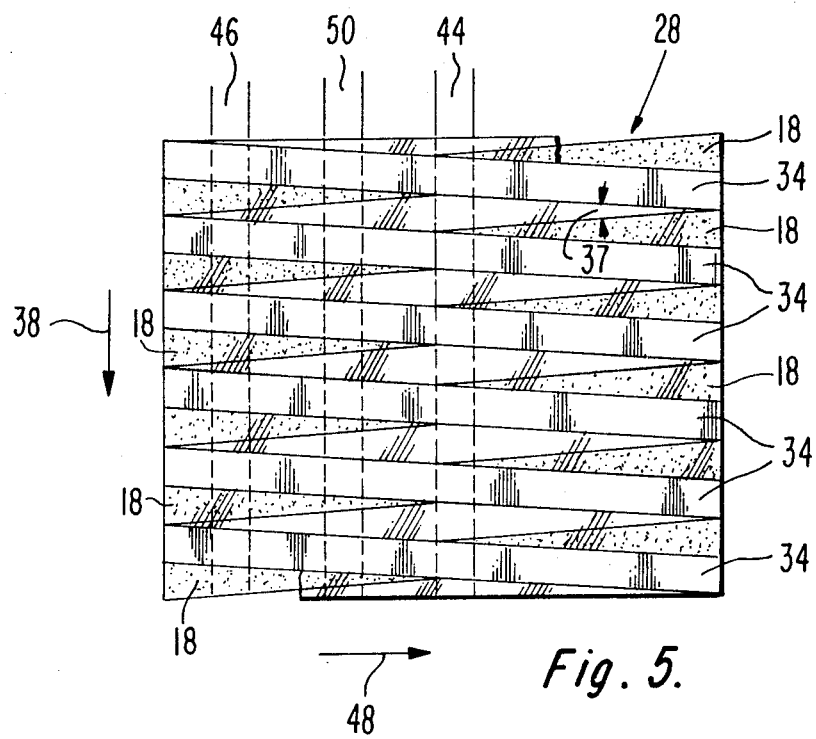
FIG. 5 is a plan view of the coupling assembly of FIG. 3.

As best shown in FIG. 5, the contiguous connection of gratings 14 and 30 maintains a separation angle 37 between bars 18 and 34. Preferably, separation angle 37 is approximately $10^{-3}$ radians. Separation angle 37 causes bars 34 to almost completely overlap bars 18 along a strip 44 (indicated by broken lines), which is parallel to the direction of arrow 38. However, along a strip 46, parallel to strip 44, there is substantially no overlap of bars 18. Additionally, the amount of overlap of bars 18 varies linearly with respect to displacement in the direction of an arrow 48 (perpendicular to the direction of arrow 38). The linear varying overlap is equivalent to a linearly varying translation of bars 34 with respect to bars 18.

When fiber 20 is placed upon bars 34 within strip 44, for example, and light is transmitted through waveguide 22 (or fiber 20), a pair of electromagnetic substrate field components (similar to the first and second field components referred to hereinbefore) extend within substrate 24. Because of the linearly varying overlap, the relative phase of the pair of field components varies linearly with respect to displacement of fiber 20 in the direction of arrow 48.

From the explanation given hereinbefore, fiber 20 may be positioned at a desired location within a strip 50 upon bars 34 where the overlap of bars 18 and the relative diffraction strengths of gratings 30 and 32 cause the pair of field components to be of equal amplitude and opposite phase.

The desired location is determined by successively placing fiber 20 at a multiplicity of locations upon bars 34 while light is transmitted through waveguide 22. When the amount of light coupled from waveguide 22 to fiber 20 is observed to be a maximum, there is substantially no net amount of light coupled to substrate 24, whereby fiber 20 is positioned at the desired location (within strip 50). In an alternative embodiment, the desired location is determined by transmitting light through fiber 20 (instead of waveguide 22) while waveguide 22 is observed (instead of fiber 20 as described hereinbefore).

At the desired location, fiber 20 and waveguide 22 form a sandwich that includes segments, 14S and 30S of gratings 14 and 30, respectively. Moreover, segments 14S and 30S are diffraction gratings that provide the essential features referred to hereinbefore.

Figure 6:
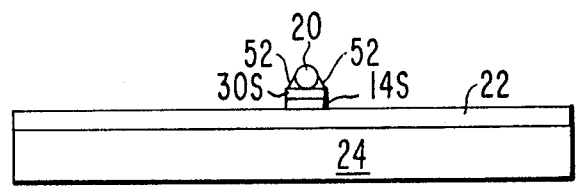
FIG. 6 is a side elevation of an optical coupler, made in accordance with the invention, that couples light between a segment of the waveguide and the fiber of FIG. 3.

As shown in FIG. 6, fiber 20 is connected by cement 52 to segment 30S at the desired location. An etching process, or any other suitable process, is used to remove all parts of assembly 28 (FIG. 3) that are not within the sandwich, thereby providing an optical coupler that includes the essential features.

Figure 7:
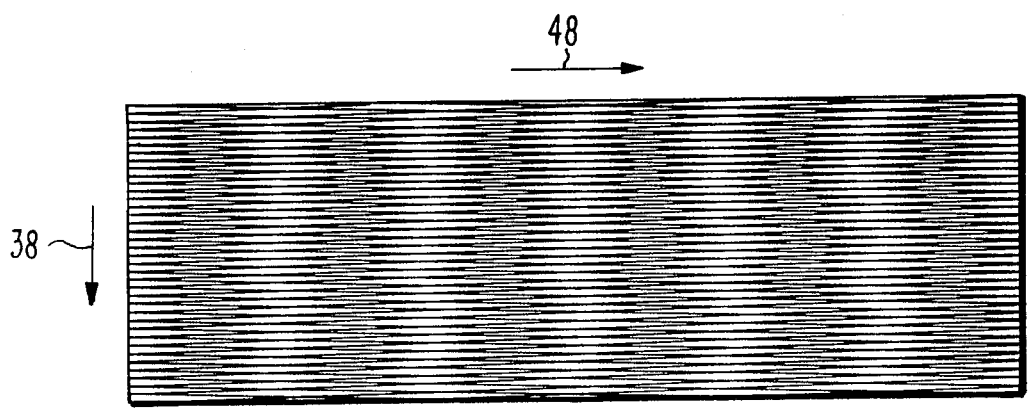
FIG. 7 is a schematic representation of a moire pattern formed by light that passes through the gratings of FIG. 2, where intensity of light of the pattern is represented by a density of lines.

To construct a plurality of similar optical couplers, when fiber 20 is positioned at the desired location, light is transmitted through assembly 28 (FIG. 4) to form a moire pattern as shown in FIG. 7. The moire pattern is comprised of lines of light of differing intensity that are parallel to the direction of arrow 38. A recording is made of the intensity of a line of light of the pattern that passes through the desired location. Thereafter, when other coupling assemblies are made as described hereinbefore, a moire pattern may be used to provide a line of light thereon having the recorded intensity, thereby identifying a strip corresponding to strip 50.

In an alternative embodiment, when there are known diffraction strengths associated with the first essential feature, an optical coupler may be made from two diffraction gratings that have constant diffraction strengths.

What is claimed is:

1. In a method of making an optical coupler that couples light between a fiber and a waveguide carried by a substrate, the steps of:
   providing first and second diffraction gratings that have a common spatial frequency, and respectively diffract first and second percentages of input light whereby said first grating has a first diffraction strength and said second grating has a second diffraction strength;
   contiguously connecting said gratings to provide a spatially varying overlap of the bars of said first grating by the bars of said second grating;
   mounting said connected gratings upon said waveguide, thereby forming a coupling assembly;
   successively placing said fiber at a multiplicity of locations upon said coupling assembly where said fiber and said waveguide form a sandwich that includes said gratings;
   transmitting a light beam that causes a coupling of light between said fiber and said waveguide via said coupling assembly during the successive placing of said fiber, said first and second diffraction strengths causing first and second components of an electromagnetic field of substantially equal amplitudes to extend within said substrate;
   fixedly connecting said fiber at a desired one of said multiplicity of locations where said coupled light is a maximum; and
   removing parts of said gratings that are not within said sandwich at said desired location.

2. An optical coupler made in accordance with the method of claim 1.

3. The method of claim 1 wherein said light is transmitted through said waveguide and said fixedly connecting step includes the step of fixedly connecting said fiber to said coupling assembly at a location where there is a maximum amount of said light coupled to said fiber.

4. The method of claim 1 wherein said light is transmitted through said fiber and said fixedly connecting step includes the step of fixedly connecting said fiber to said coupling assembly at a location where there is a maximum amount of said light coupled to said waveguide.

5. The method of claim 1 wherein said first and second diffraction strengths of said providing step are constant and spatially variable, respectively.

6. An optical coupler made in accordance with the method of claim 5.

7. The method of claim 1 including the additional step of transmitting light through said coupling assembly to generate a moire pattern that includes a line of light of a known intensity that passes through said desired location and said fixedly connecting step includes the step of fixedly connecting said fiber within a strip identified by said line of light.

8. An optical coupler made in accordance with the method of claim 7.

* * * * *